United States Patent
Chen et al.

(10) Patent No.: US 7,355,999 B2
(45) Date of Patent: Apr. 8, 2008

(54) METHOD AND APPARATUS FOR CARRYING PACKETIZED VOICE AND DATA IN WIRELESS COMMUNICATION NETWORKS

(75) Inventors: Tao Chen, San Diego, CA (US); Nikolai K. N. Leung, Takoma Park, MD (US); Raymond Tah-Sheng Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 588 days.

(21) Appl. No.: 10/327,355

(22) Filed: Dec. 20, 2002

(65) Prior Publication Data
US 2003/0086378 A1    May 8, 2003

(51) Int. Cl.
*H04Q 7/00* (2006.01)
(52) U.S. Cl. ........................ 370/329; 455/450
(58) Field of Classification Search ............... 370/208, 370/209, 310.1, 310.2, 319, 320, 328, 329, 370/335, 338, 342, 437, 441, 535
See application file for complete search history.

(56) References Cited

U.S. PATENT DOCUMENTS

| | | | |
|---|---|---|---|
| 5,790,551 A * | 8/1998 | Chan | 370/458 |
| 5,859,840 A * | 1/1999 | Tiedemann et al. | 370/335 |
| 6,005,855 A * | 12/1999 | Zehavi et al. | 370/335 |
| 6,477,176 B1* | 11/2002 | Hamalainen et al. | 370/435 |
| 6,507,572 B1* | 1/2003 | Kumar et al. | 370/335 |
| 6,522,638 B1* | 2/2003 | Haugli et al. | 370/329 |
| 6,529,527 B1* | 3/2003 | Chen et al. | 370/503 |
| 6,724,740 B1* | 4/2004 | Choi et al. | 370/335 |

* cited by examiner

*Primary Examiner*—Anh-Vu Ly
(74) *Attorney, Agent, or Firm*—Abdollah Katbab; Kam T. Tam; Thomas R. Rouse (57) ABSTRACT

A method and apparatus for reducing transmission delay in a wireless communication system that carries packetized voice and data information. Interruptions in the traffic channels cause loss of synchronization between a header compressor and a header decompressor. Rather than transmitting resynchronization information on the traffic channel, the information dropped by an interruption is re-transmitted on a non-traffic channel in parallel with the traffic channel. At the remote station, information from the traffic channel and the non-traffic channel is reassembled before input into the decompressor. Alternatively, the non-traffic channel can be used to carry overflow information so that a higher average data rate can be achieved than the average data rate of the traffic channel alone.

9 Claims, 5 Drawing Sheets

METHOD AND APPARATUS FOR CARRYING PACKETIZED VOICE AND DATA IN WIRELESS COMMUNICATION NETWORKS

BACKGROUND

I. Field of the Invention

The present invention relates to data communication. More particularly, the present invention relates to a novel and improved method and apparatus for transmitting packetized voice and data over communication networks.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard, or a CDMA system that conforms to the "TIA/EIA/IS-2000-2 Physical Layer Standard for cdma2000 Spread Spectrum Systems," hereinafter referred to as the cdma2000 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In this specification, base station refers to the hardware with which the remote stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In the CDMA system, communications between users are conducted through one or more base stations. A first user on one remote station communicates to a second user on a second remote station by transmitting data on the reverse link to a base station. The base station receives the data and can route the data to another base station. The data is transmitted on the forward link of the same base station, or a second base station, to the second remote station. The forward link refers to transmission from the base station to a remote station and the reverse link refers to transmission from the remote station to a base station. In IS-95 and cdma2000 systems, the forward link and the reverse link are allocated separate frequencies.

Given the growing demand for wireless data applications, the need for very efficient wireless data communication systems has become increasingly significant. The IS-95 and cdma2000 standards are capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques, which require significantly larger delays than those that can be tolerated by voice services, can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," filed Nov. 6, 1996, assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

Various protocols exist for transmitting packetized data over communication systems so that information arrives at its intended destination. One such protocol is "The Internet Protocol," RFC 791 (September, 1981). The internet protocol (IP) breaks up data messages into packets, routes the packets from a sender to a destination, and reassembles the packets into the original data messages at the destination. The IP protocol requires that each data packet begins with an IP header containing source and destination address fields that uniquely identifies host and destination computers. The transmission control protocol (TCP), promulgated in RFC 793 (September, 1981), is responsible for the reliable, in-order delivery of data from one application to another.

A typical TCP/IP header is 40 bytes long, wherein 20 bytes are required to satisfy the IP protocol and 20 bytes are required to satisfy the TCP protocol.

In a slow communication link, the overhead required for transmitting TCP/IP headers may be unacceptable for end users. As is well known in the art, this header overhead problem has been solved with compression techniques, such as the one promulgated by RFC 1144 (February, 1990), entitled "Compressing TCP/IP Headers for Low-Speed Serial Links," wherein a data packet undergoes differential coding. Compression is accomplished with a compressor that receives a header and extracts only those fields in the header that differ from the fields in the previous header. If the differences in the changing fields are sent rather than the fields themselves, a significant savings can be achieved. Consequently, a decompressor at the receiving end must be synchronized with the compressor so that the proper ordering of compressed headers is maintained. If the compressor and the decompressor are not in the same state, then the decompressor must be resynchronized with a transmission of the first, uncompressed packet of a compressed packet sequence.

Header compression is often used in wireless communication systems to improve the bandwidth and power efficiency of the link by increasing the percentage of the link used for the information payload. Unfortunately, due to the nature of wireless communication systems, temporary interruptions in the delivery of information packets are not uncommon. The occurrence of any such interruption may cause significant delays due to the need to retransmit a resynchronization packet to resynchronize a decompressor at a target locale and a need to re-negotiate traffic parameters between the compressor end and the decompressor end. There is a present need to reduce the amount of delay caused by the transmission of resynchronization and re-negotiation information, and to increase the data throughput rate of the system accordingly. The need to increase the data throughput rate is always present in modern communication systems that support a variety of applications.

SUMMARY

The present invention is directed to a novel and improved method and apparatus for reducing transmission delay in a wireless communication system carrying packetized information between a base station and a remote station, wherein the base station and the remote station communicate through multiple channels, comprising the steps of: transmitting a plurality of frames on a traffic channel from a transmitter to a receiver; detecting an interruption of the traffic channel, wherein a payload overhead is generated to maintain synchronicity between the transmitter and the receiver; and re-transmitting the payload overhead on at least one additional channel, wherein the step of re-transmitting the payload overhead on the at least one additional channel occurs concurrently with the step of transmitting the plurality of frames on the traffic channel.

In one aspect of an embodiment, control channels and supplemental channels are used to carry general overflow whenever the average data rate of the transmission is higher than the data rate than can be accommodated on the fundamental traffic channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
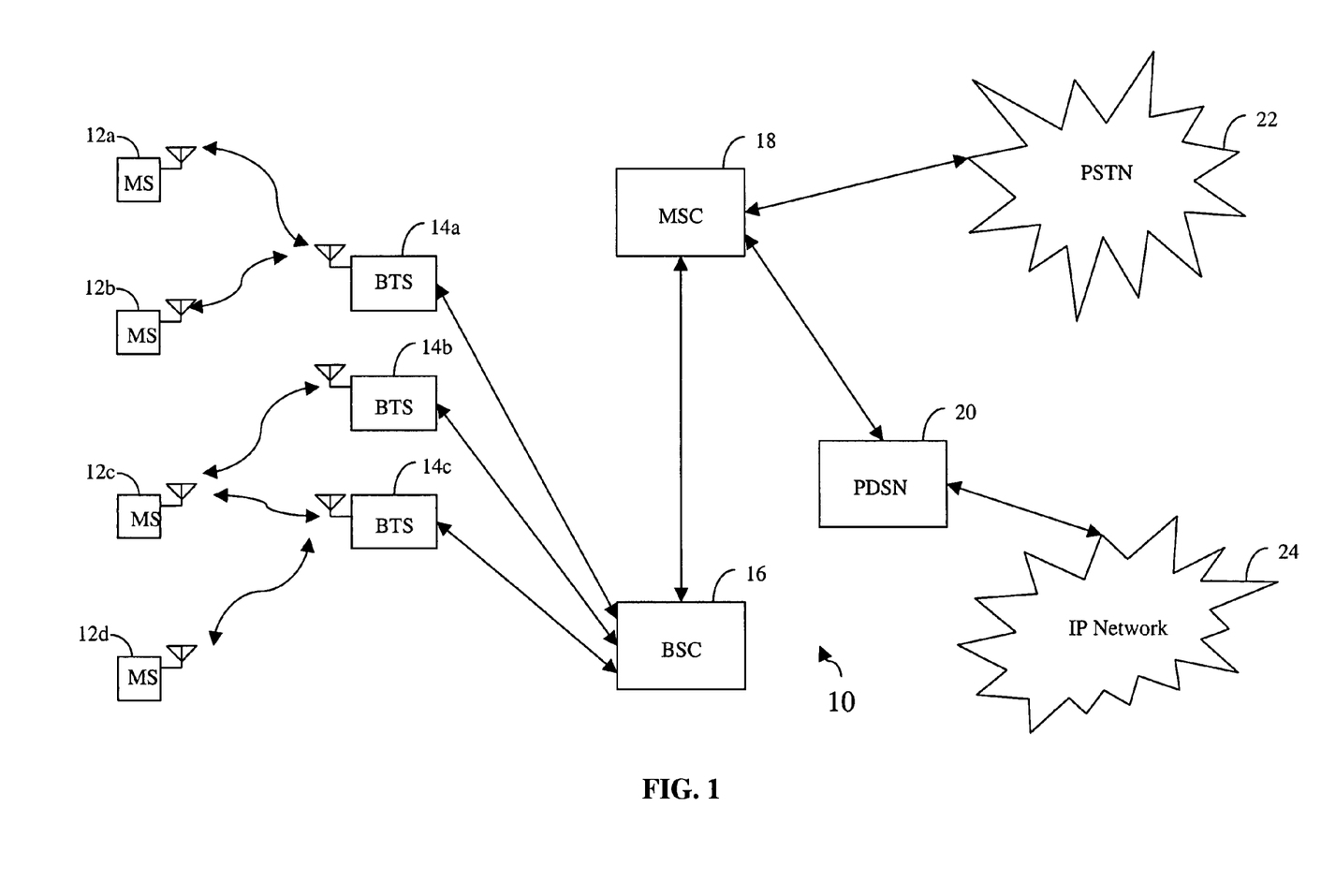
FIG. 1 is a diagram of an exemplary wireless communication system.

As illustrated in FIG. 1, a wireless communication network 10 generally includes a plurality of mobile stations (also called subscriber units or user equipment) 12a-12d, a plurality of base stations (also called base station transceivers (BTSs) or Node B). 14a-14c, a base station controller (BSC) (also called radio network controller or packet control function 16), a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may advantageously be configured to perform one or more wireless packet data protocols such as described in, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In another embodiment of the invention, the mobile stations 12a-12d communicate with the base stations 14a-14c over an RF interface defined in the 3$^{rd}$ *Generation Partnership Project* 2 "3*GPP*2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a-14c receive and demodulate sets of reverse-link signals from various mobile stations 12a-12d engaged in telephone calls, Web browsing, or other data communications. Each reverse-link signal received by a given base station 14a-14c is processed within that base station 14a-14c. Each base station 14a-14c may communicate with a plurality of mobile stations 12a-12d by modulating and transmitting sets of forward-link signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

The forward link comprises a plurality of pilot and traffic channels, wherein each channel is spread by an appropriate Walsh or quasi-orthogonal function. Each channel is then spread by a quadrature pair of pseudonoise (PN) sequences at a fixed chip rate of 1.2288 Mcps. The use of Walsh codes and PN sequences allows a base station to generate multiple forward link CDMA channels in a frequency division multiplexed manner. In a multiple channel CDMA system, such as one described by the cdma2000 standard, the forward link channels can comprise multiple channels, including but not limited to, pilot channels, synchronization channels, paging channels, broadcast channels, assignment channels, common power control channels, common control channels, dedicated control channels, fundamental channels, supplemental channels, and supplemental code channels. The reverse traffic channels can also comprise multiple channels, including but not limited to access channels, common control channels, fundamental channels, supplemental channels, and supplemental code channels, as specified by radio configurations of each individual subscriber network using cdma2000.

Each channel is physically constructed to achieve functionally different purposes. For example, a pilot channel may be simply spread using Walsh code "$W_0$" but a synchronization channel is an encoded, interleaved, spread, and modulated spread spectrum signal. The other forward and reverse link channels are also encoded, interleaved, spread, and modulated spread spectrum signals, but manipulated with various values to satisfy various requirements imposed by the appropriate telecommunication standard.

Eliminating Re-synchronization and Re-negotiation Delays

In an exemplary embodiment, the multiple forward and reverse link channels are used to solve the resynchronization and re-negotiation delay problem that is caused by interruptions in signal transmissions. For illustrative purposes, the exemplary embodiment will be described in relation to the forward link, from base station to remote station. However, it should be noted that the exemplary embodiment may be implemented on the reverse link, from a remote station to a base station.

Due to the mobile nature of wireless communication devices, it is not uncommon for interruptions in signal transmissions to occur. As discussed above, when voice information is being conveyed from a transmission end to a receiving end, delays caused by interruptions will negatively impact the quality of the service, as perceived by the service subscriber. In the current state of the art, packetized voice or data information is carried on the fundamental or traffic channels, which are designated for the transmission of payload traffic to a specific receiving end. In the exemplary embodiment of the invention, a control channel is used to carry payload overhead or overflow information that would have otherwise been carried by the fundamental channel. The additional use of the control channel allows a transmitting end, such as a base station or a remote station, to manipulate the data throughput rates of the packetized voice and data payload.

In one aspect of the exemplary embodiment, a Dedicated Control Channel (DCCH) operates in parallel with a Fundamental Channel (FCH) to carry overflow information. The DCCH is designed to transmit 5 ms or 20 ms frames in a continuous or a non-continuous manner, and the decision to enable or disable transmission may be made on a frame-by-frame basis. Hence, inadvertent overflows of arbitrary durations on the FCH can be accommodated immediately. In one implementation, a single DCCH from a base station can be shared by multiple remote stations through the use of scrambling codes, so that frames transmitted on the single DCCH are uniquely coded for an intended station. The generation of scrambling codes is well known in the art and will not be discussed herein. The remote stations that are monitoring the single DCCH would not be able to properly decode scrambled frames if they were not the intended recipients of those scrambled frames. Such scrambled frames would be designated as erasures by the untargeted remote stations receiving the scrambled frames. In another embodiment, a base station could use orthogonal codes, such as Walsh codes, to generate multiple DCCHs, wherein each remote station would be assigned an individual DCCH. It should be noted that Walsh codes can also be used as scrambling codes for purposes of the embodiment above.

Increasing the Average Data Rate

In yet another exemplary embodiment of the invention, the multiple channels are used to carry general payloads whenever the average data rate of the data transmission is higher than the data rate that can be accommodated by the FCH. In general, a base station operated by a wireless communication service provider is assigned a set of operational configurations in accordance with the service provider's system, wherein some data rates are supported and others are not. These operational configurations are referred to as Radio Configurations in the cdma2000 and IS-95 standards, wherein each configuration is associated with a specific data rate set, spreading rate, error correction capability, and other general characteristics. In the cdma2000 standard, a base station can support numerous Radio Configurations concurrently. However, the support of certain Radio Configurations precludes support of others. For example, if a base station supports Radio Configuration 2, then it must support Radio Configuration 1. However, the base station cannot use Radio Configuration 1 or 2 simultaneously with Radio Configurations 3, 4, or 5. Table 1 provides more details as to Radio Configuration Characteristics for the Forward Traffic Channel.

TABLE 1

| Radio Configuration | Spreading Rate | Supported Data Rates (in bps) |
| --- | --- | --- |
| 1 | 1 | 1200, 2400, 4800, 9600 |
| 2 | 1 | 1800, 3600, 7200, 14400 |
| 3 | 1 | 1500, 2700, 4800, 9600, 19200, 38400, 76800, 153600 |
| 4 | 1 | 1500, 2700, 4800, 9600, 19200, 38400, 76800, 153600, 307200 |
| 5 | 1 | 1800, 3600, 7200, 14400, 28800, 57600, 115200, 230400 |
| 6 | 3 | 1500, 2700, 4800, 9600, 19200, 38400, 76800, 153600, 307200 |
| 7 | 3 | 1500, 2700, 4800, 9600, 19200, 38400, 76800, 153600, 307200, 614400 |
| 8 | 3 | 1800, 3600, 7200, 14400, 28800, 57600, 115200, 230400, 460800 |
| 9 | 3 | 1800, 3600, 7200, 14400, 28800, 57600, 115200, 230400, 460800, 1036800 |

If a Radio Configuration that does not enable higher data rates is implemented by the service provider, the exemplary embodiment can be used to allow the system to achieve a higher data throughput rate.

In addition to data rates, the assignment of a Radio Configuration can also impact the frame sizes on channels. For example, a Forward SCH frame of 20 ms duration, transmitted at 1500 bps for Radio Configuration 6, contains 16 bits. However, a Forward SCH frame of 20 ms duration, transmitted at 1800 bps for radio Configuration 8, carries 21 bits. At higher speeds, the cdma2000 standard allows a base station to transmit variable amounts of bits in extended frame durations. The exemplary embodiment can use this capability to increase the average data throughput rate of the system, as described below.

Figure 2:
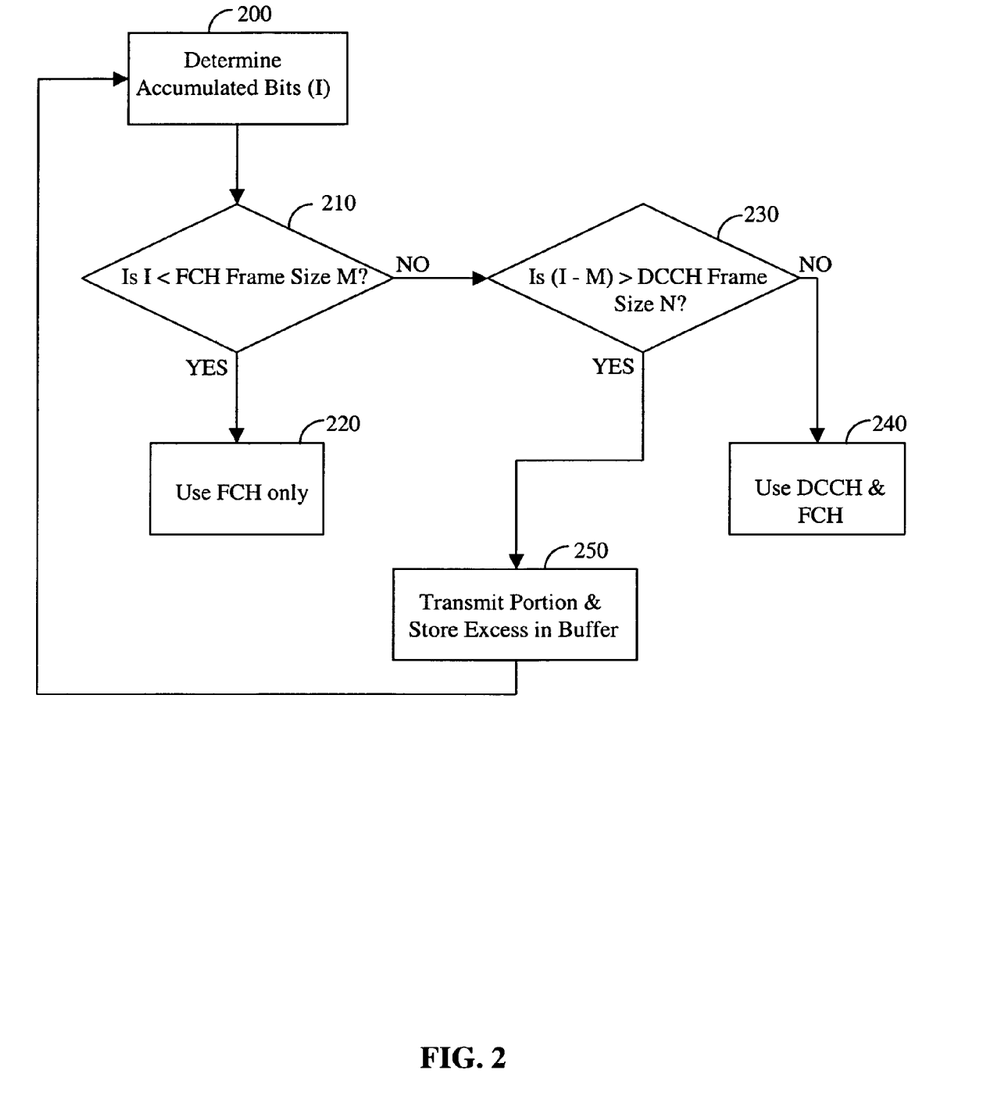
FIG. 2 is a flowchart illustrating a method for allocating accumulated information on a traffic channel and a control channel.

FIG. 2 is a flowchart illustrating a method for distributing accumulated information on multiple channels, wherein a DCCH is used together with a FCH to carry payloads. At step 200, an infrastructure element (not shown) at the transmission end determines the amount of accumulated information (I, measured bits) that needs to be transmitted. In addition to the accumulated information, the infrastructure element can estimate the amount of information that will be expected to arrive during an interim period before the actual transmission on the channels. For illustrative purposes, the accumulated and the estimated information will be referred to together as "accumulated information" in this document. The infrastructure element may be a base station or a remote station of a wireless communication system and the steps may be advantageously implemented by a processor, a micro-controller, application specific integrated circuit, or other equivalent forms of hardware or software, as described further below.

At step 210, the infrastructure element determines whether the amount of accumulated information is less than the maximum frame size (M, measured in number of payload bits) on the FCH. If I<M, then the program flow proceeds to step 220. At step 220, the infrastructure element transmits the accumulated information on the FCH. If I≧M, then the program flow proceeds to step 230. At step 230, the infrastructure element determines whether (I−M)>N, wherein N is the maximum frame size permissible on the DCCH.

If (I−M)≦N, then the program flow proceeds to step 240. At step 240, the infrastructure element transmits the accumulated information on the DCCH and the FCH. If (I−M)>N, then the program flow proceeds to step 250. At step 250, the infrastructure element transmits the accumulated information that corresponds to (I−M)≦N and stores the excess overload in a buffer, whereupon the program flow proceeds back to step 200 and the process repeats. In one implementation, the infrastructure element can transmit the first sequential bits of the accumulated information to the remote station, without consideration of the relative importance of the information to be transmitted. In another implementation, the infrastructure element can weigh the relative importance of the contents of the accumulated information and transmit the more important information first. The relative importance of the information can be judged by a variety of factors. For example, the priority indicator on the IP packet header can be used to determine whether information should be transmitted quickly or stored in a transmit buffer for transmission using a later frame.

In another aspect of the exemplary embodiment, a Supplemental Channel (SCH) operates in parallel with a FCH to increase the average data throughput rate. The SCH is designed to transmit 20 ms, 40 ms, or 80 ms frames in a continuous or discontinuous manner, in accordance with an assigned Radio Configuration. The transmission of the SCH to a remote station may be scheduled or unscheduled. When the transmission of the SCH to a remote station is unscheduled, the remote station receives an indefinitely long assignment to monitor for the SCH. When the transmission of the SCH to a remote station is scheduled, the transmission of overflow information from the FCH may be delayed until the next scheduled transmission of the SCH. However, using this implementation of the embodiment, there would be no need for the remote station to continuously monitor for the SCH at unscheduled times.

In one implementation, a single SCH can be shared by multiple remote stations through the use of scrambling codes, so that frames transmitted on the single SCH are uniquely coded for an intended station. One example of a scrambling code is the Walsh code. The remote stations that are monitoring the single SCH would not be able to properly decode scrambled frames if they are not the intended recipients of those scrambled frames. Such scrambled frames would be designated as erasures by the untargeted remote stations receiving the scrambled frames. In another implementation, a base station could use orthogonal codes, such as Walsh codes, to generate multiple SCHs, wherein each remote station would be assigned an individual SCH.

Figure 3:
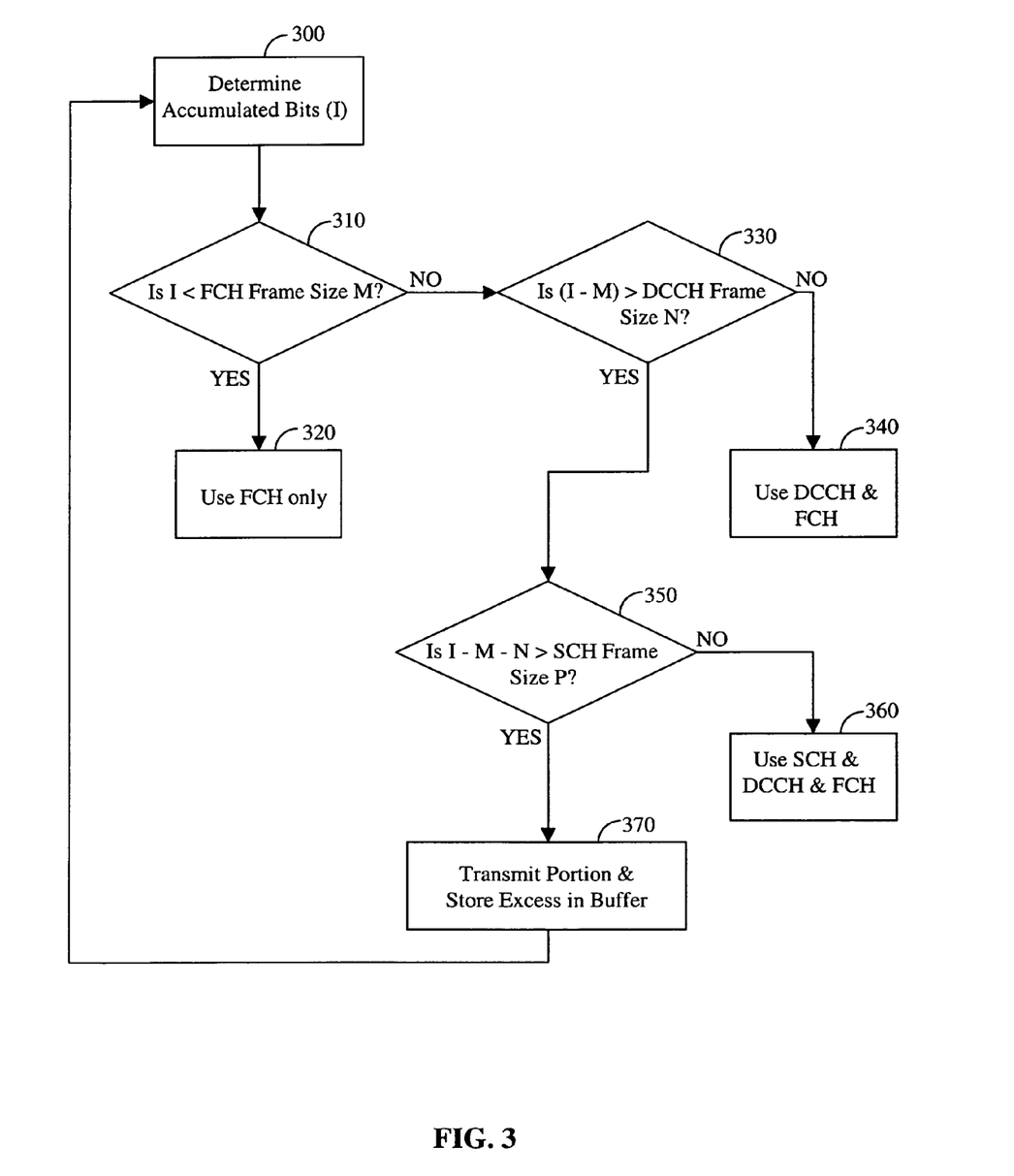
FIG. 3 is a flowchart illustrating a method for transmitting accumulated information on a traffic channel, a control channel, and a supplemental channel.

FIG. 3 illustrates another embodiment, wherein a dedicated control channel and a supplemental channel are both used in parallel with a fundamental channel to increase the average data throughput rate. At step 300, an infrastructure element at the transmission end determines the amount of accumulated information (I, measured in bits) that needs to be transmitted. At step 310, the infrastructure element determines whether the amount of accumulated information is less than the maximum frame size (M, measured in number of payload bits) on the FCH. If I<M, then the program flow proceeds to step 320. At step 320, the infrastructure element transmits the accumulated information on the FCH, wherein the accumulated information is carried by a frame which is the smallest size capable of carrying the accumulated information.

If I≧M, then the program flow proceeds to step 330. At step 330, the infrastructure element determines whether (I−M)>N, wherein N is the maximum frame size on the DCCH. If (I−M)≦N, then the program flow proceeds to step 340. At step 340, the infrastructure element transmits the accumulated information on the DCCH and the FCH. If (I−M)>N, then the program flow proceeds to step 350. At step 350, the infrastructure element determines whether (I−M−N)>P, wherein P is the maximum frame size on the SCH.

If (I−M−N)≦P, then the program flow proceeds to 360. At step 360, the infrastructure element transmits the accumulated information on the SCH, the DCCH and the FCH. If the SCH supports more than one frame size, then the smallest or the most capacity-efficient frame should be chosen to transmit the (I−M−N) bits. If (I−M−N)≧P, then the program flow proceeds to step 370. At step 370, the infrastructure element transmits the accumulated information that corresponds to (I−M−N)≦P and stores the excess overload in a buffer, whereupon the program flow proceeds back to step 300 and the process repeats. It should be noted that if multiple supplemental channels are assigned to the transmission end, then the value 'P' would be substituted with the sum of the maximum frame sizes carried by each assigned SCH.

Figure 4:
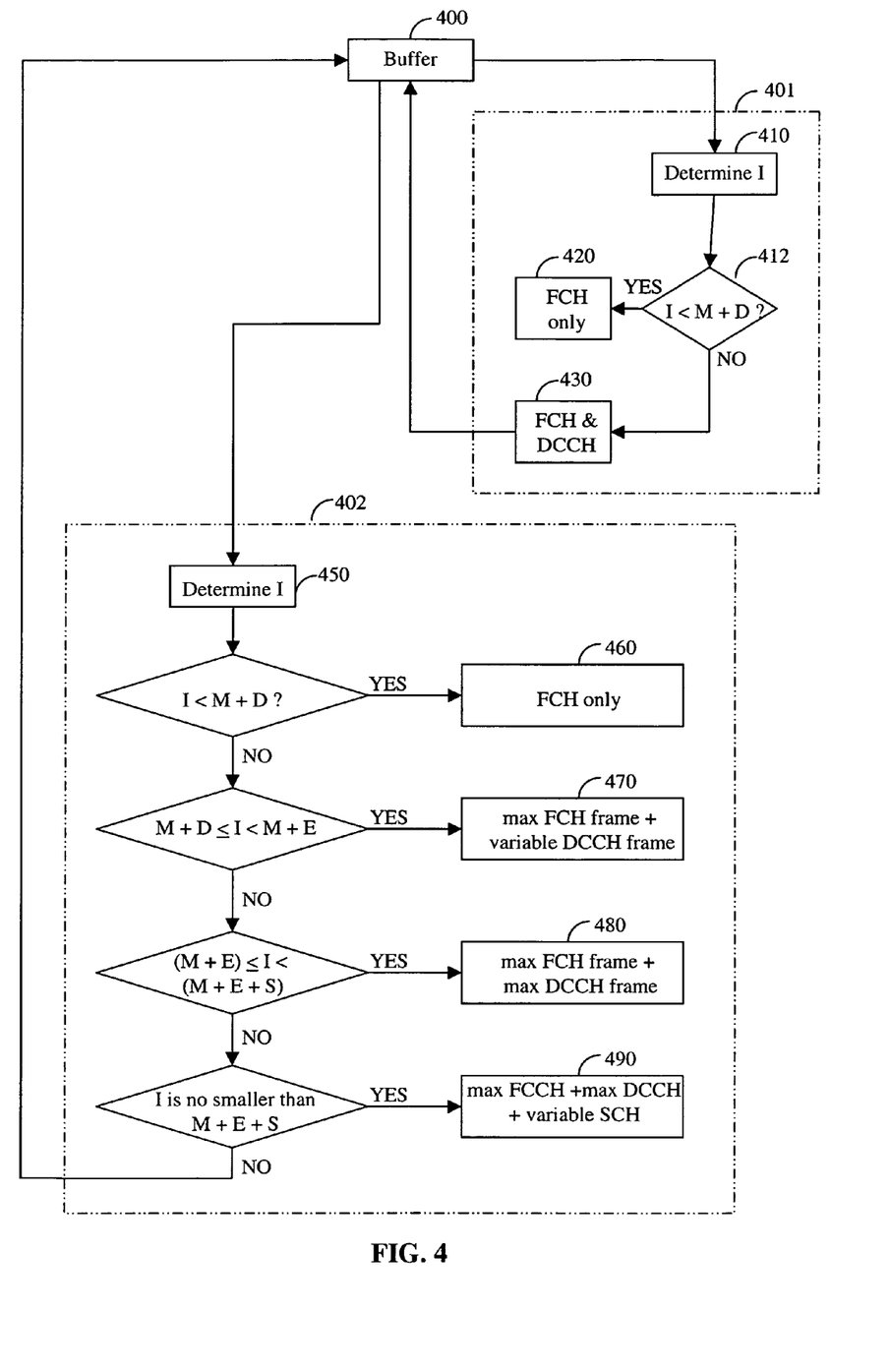
FIG. 4 is a flowchart illustrating a method for choosing a frame size for accumulated information to be transmitted on various channels.

In another embodiment of the invention, packetized voice and data (payload) can be transmitted over multiple channels in advantageously sized frames, wherein the sizes of the frames carrying the payload are chosen based on the size of the payload. Depending on the amount of accumulated information queued for transmission, the transmission end would transmit using only the FCH, transmit using only the FCH and the DCCH, or alternatively, transmit using the combination of the FCH, the DCCH, and the SCH. FIG. 4 is a flowchart illustrating the method of this embodiment. At step 400, payload traffic is stored in a transmit buffer. If the transmission end is assigned the use of only FCHs and DCCHs, without any SCH channels, then the program flow proceeds to block 401. If the transmission end is assigned FCHs, DCCHs, and SCHs, then the program flow proceeds to block 402.

At step 410 in block 401, an infrastructure element determines the amount of accumulated information I, measured in bits, that needs to be transmitted. At step 412, a comparison is made between the amount of accumulated information and the frame sizes carried by the various channels. If I is smaller than the sum of the maximum frame size on the FCH (M, measured in the number of payload bits) and the minimum non-zero frame size on the DCCH (D, measured in the number of payload bits) so that I<(M+D), then the DCCH is not used for transmitting the accumulated information I, and the program flow proceeds to step 420. At step 420, the accumulated information is transmitted on the FCH, wherein the size of the FCH frame is determined based on accumulated information I. In one implementation, the size of the FCH frame is determined to be the largest frame that will carry the accumulated information I without wasting any bit space in the frame.

If the accumulated information I is no smaller than the sum of (M+D), then the program flow proceeds to step 430. At step 430, the largest FCH frame and the smallest DCCH frame that carries at least (I−M) bits are used to carry the accumulated information. If the accumulated information I is greater than the sum of the largest FCH frame and largest DCCH frame, the bits that cannot be transmitted on the FCH and the DCCH are stored in the transmit buffer and will be transmitted at a later time.

At step 450 in block 402, an infrastructure element determines the amount of accumulated information I, measured in bits, that needs to be transmitted. Let M be the maximum frame size, in number of payload bits, on the FCH, D be the minimum non-zero frame size on the DCCH, E be the maximum frame size on the DCCH, and S be the minimum non-zero frame size on the SCH. If I<(M+D), the program flow proceeds to step 460. If (M+D)≦I<(M+E), then the program flow proceeds to step 470. If (M+E)≦I<(M+E+S), then the program flow proceeds to step 480. If I is no smaller than (M+E+S), then the program flow proceeds to step 490.

At step 460, the transmission end transmits the accumulated information I using a FCH frame, wherein the FCH frame size is determined based on I. In one implementation, the FCH frame is chosen to be no more than I bits in size, so that space is not wasted in the frame.

At step 470, the transmission end transmits the accumulated information I using a FCH frame and a DCCH frame, wherein the chosen FCH frame is a maximum size and the chosen DCCH frame is no more than (I−M) bits in size.

At step 480, the transmission end transmits the accumulated information I using a FCH frame and a DCCH frame, wherein the chosen FCH frame has a maximum FCH frame size and the chosen DCCH frame has a maximum DCCH frame size.

At step 490, the transmission end transmits the accumulated information I using a FCH frame, a DCCH frame, and a; SCH frame, wherein the chosen FCH frame has a maximum FCH frame size and the chosen DCCH frame has a maximum DCCH frame size. However, the chosen SCH frame is no more than (I−M−E) bits in size.

It should be noted that this embodiment of the invention is optimally efficient with respect to air-link usage and capacity, since no capacity is wasted. However, in achieving this efficiency, some delay may be added to the transmission since not all of the accumulated information bits are sent immediately. In the embodiments in which delay is incurred during the transmission of the accumulated information, a de-jitter buffer must be implemented in the receiving end in order to accommodate the delay.

Figure 5:
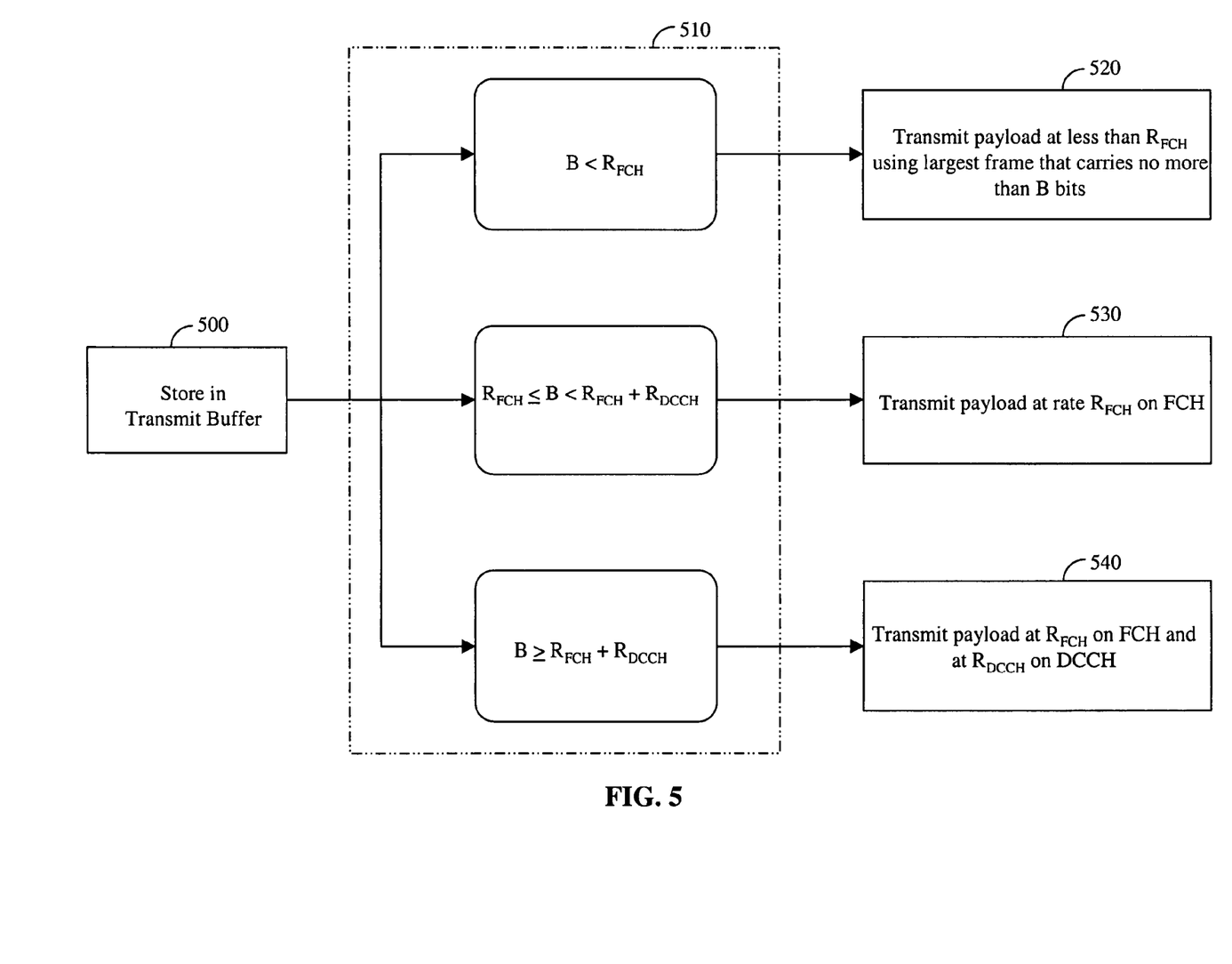
FIG. 5 is a flowchart illustrating a method for transmitting accumulated information using various data rates on various channels.

In another implementation of the exemplary embodiment, accumulated overflow information can be transmitted with minimal delay by choosing transmission rates on the channels in accordance with the amount of accumulated overflow information. FIG. 5 is a flowchart illustrating an alternative exemplary embodiment of the invention. At step 500, an infrastructure element adds the current payload to a transmit buffer, wherein the transmit buffer can hold up to B bits. The current payload may include a frame of voice data, a frame of voice data with header information, or frames carrying other types of data. At step 510, the infrastructure element decides whether the transmit buffer size is less than the rate of the FCH, (i.e., $B<R_{FCH}$, wherein B is in units of bits and $R_{FCH}$ is in units of bits/sec), whether the transmit buffer size is greater than or equal to the rate of the FCH but less than the rate of the DCCH together with the rate of the FCH(i.e., $R_{FCH} \leq B < R_{FCH} + R_{DCCH}$), or whether the transmit buffer size is greater than or equal to the rate of the DCCH together with the rate of the FCH (i.e., $B \geq R_{FCH+RDCCH}$).

If $B<R_{FCH}$, the program flow proceeds to step 520. At step 520, the base station transmits the current payload on the FCH at a rate less than $R_{FCH}$ and uses the largest frame that carries no more than B bits for the transmission.

If $R_{FCH} \leq B < R_{FCH} + R_{DCCH}$, then the program flow proceeds to step 530. At step 530, the base station transmits the current payload at the rate $R_{FCH}$ on the FCH.

If $B \geq R_{FCH} + R_{DCCH}$, then the program flow proceeds to step 540. At step 540, the base station reapportions the current payload in order to transmit the current payload at rate $R_{FCH}$ on the FCH and at rate $R_{DCCH}$ on the DCCH.

Thus, a novel and improved method and apparatus for using multiple channels for carrying overflow information have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, micro-controller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method for increasing an average data transmission rate in a wireless communication system carrying packetized information, comprising:

determining the bit size of a payload for transmission from a transmitter to at least one receiver, wherein the transmitter communicates with the at least one receiver through a traffic channel and at least one additional channel;

if the bit size of the payload is less than or equal to a maximum frame size of a traffic channel frame, then transmitting the payload on the traffic channel; and if the bit size of the payload is greater than the maximum frame size of the traffic channel frame, then transmitting the payload on the traffic channel and a control channel concurrently, wherein the payload has been distributed between a traffic channel frame and a control channel frame.

2. The method of claim 1, wherein the at least one additional channel includes a supplemental channel.

3. The method of claim 2, further comprising:

if the bit size of the payload is greater than the sum of the maximum frame size of the traffic channel frame and a maximum frame size of the control channel frame, then transmitting the payload on the traffic channel, the control channel, and the supplemental channel concurrently, wherein the payload has been distributed between the traffic channel frame, the control channel frame, and a supplemental channel frame.

4. The method of claim 3, further comprising: if the bit size of the payload is greater than the sum of the maximum frame size of the traffic channel frame, the maximum frame size of the control channel frame, and the maximum frame size of the supplemental channel frame, then transmitting a portion of the payload on the traffic channel, the control channel, and the supplemental channel; and storing a remaining portion of the payload in a buffer.

5. The method of claim 1, wherein the step of transmitting the payload on the traffic channel is performed at a first rate on the traffic channel.

6. The method of claim 1, wherein the step of transmitting the payload on the traffic channel and the control channel concurrently is performed at a first rate on the traffic channel and a second rate on the control channel.

7. The method of claim 2, wherein the step of transmitting the payload on the traffic channel, the control channel, and the supplemental channel is performed at a first rate on the traffic channel, a second rate on the control channel, and a third rate on the supplemental channel.

8. An apparatus for increasing an average data transmission rate in a wireless communication system carrying packetized information, comprising:

means for determining the bit size of a payload for transmission from a transmitter to at least one receiver, wherein the transmitter communicates with the at least one receiver through a traffic channel and at least one additional channel;

means for transmitting the payload on the traffic channel if the bit size of the payload is less than or equal to a maximum frame size of a traffic channel frame; and means for transmitting the payload on the traffic channel and a control channel concurrently if the bit size of the payload is greater than the maximum frame size of the traffic channel frame, wherein the payload has been distributed between a traffic channel frame and a control channel frame.

9. An apparatus for increasing an average data transmission rate in a wireless communication system carrying packetized information, comprising:

a processor;

a storage element coupled to the processor comprising an instruction set executable by the processor, wherein the instruction set comprise instructions for:

determining the bit size of a payload for transmission from a transmitter to at least one receiver, wherein the transmitter communicates with the at least one receiver through a traffic channel and at least one additional channel;

transmitting the payload on the traffic channel if the bit size of the payload is less than or equal to a maximum frame size of a traffic channel frame; and transmitting the payload on the traffic channel and a control channel concurrently if the bit size of the payload is greater than the maximum frame size of the traffic channel frame, wherein the payload has been distributed between a traffic channel frame and a control channel frame.

* * * * *